US011624024B2

(12) United States Patent
Li et al.

(10) Patent No.: US 11,624,024 B2
(45) Date of Patent: Apr. 11, 2023

(54) THERMOCHROMIC POLYMER COMPOSITION, ELECTRICAL DEVICE, AND CORRESPONDING USE AND PROCESSES

(71) Applicant: ABB Schweiz AG, Baden (CH)

(72) Inventors: Nan Li, Beijing (CN); Jiansheng Chen, Beijing (CN); Yan Gao, Memphis, TN (US); Cuicui Su, Beijing (CN); Ding Wang, Beijing (CN); Bo Qiao, Beijing (CN)

(73) Assignee: ABB SCHWEIZ AG, Baden (CH)

( * ) Notice: Subject to any disclaimer, the term of this patent is extended or adjusted under 35 U.S.C. 154(b) by 558 days.

(21) Appl. No.: 16/503,697

(22) Filed: Jul. 5, 2019

(65) Prior Publication Data
US 2019/0330523 A1    Oct. 31, 2019

Related U.S. Application Data

(63) Continuation-in-part of application No. PCT/CN2017/070111, filed on Jan. 4, 2017.

(51) Int. Cl.
| | |
|---|---|
| *C09K 9/02* | (2006.01) |
| *C08K 3/04* | (2006.01) |
| *C08K 3/22* | (2006.01) |
| *C08K 5/00* | (2006.01) |
| *C08K 5/13* | (2006.01) |
| *C08K 5/524* | (2006.01) |
| *C08L 23/06* | (2006.01) |
| *C08L 23/08* | (2006.01) |
| *C08L 23/12* | (2006.01) |
| *C08L 27/06* | (2006.01) |
| *C08L 27/18* | (2006.01) |
| *C08L 67/02* | (2006.01) |
| *C08L 77/00* | (2006.01) |

(52) U.S. Cl.
CPC ............... *C09K 9/02* (2013.01); *C08K 3/04* (2013.01); *C08K 3/22* (2013.01); *C08K 5/005* (2013.01); *C08K 5/13* (2013.01); *C08K 5/524* (2013.01); *C08L 23/06* (2013.01); *C08L 23/0892* (2013.01); *C08L 23/12* (2013.01); *C08L 27/06* (2013.01); *C08L 27/18* (2013.01); *C08L 67/02* (2013.01); *C08L 77/00* (2013.01); *C08K 2003/2241* (2013.01); *C08K 2003/2296* (2013.01); *C08L 2310/00* (2013.01)

(58) Field of Classification Search
CPC . C08K 3/04; C08K 3/22; C08K 5/005; C08K 5/13; C08K 5/524; C08K 2003/2241; C08K 2003/2296; C08L 23/06; C08L 23/0892; C08L 23/12; C08L 27/06; C08L 27/18; C08L 67/02; C08L 7/00; C08L 2310/00; C09K 9/02
USPC ........................................................ 252/586
See application file for complete search history.

(56) References Cited

U.S. PATENT DOCUMENTS

| | | |
|---|---|---|
| 4,344,909 A | 8/1982 | De Blauwe |
| 4,450,023 A | 5/1984 | De Blauwe |
| 4,498,938 A | 2/1985 | Moisson et al. |
| 4,963,415 A | 10/1990 | Carlson et al. |
| 5,558,700 A | 9/1996 | Shibahashi et al. |
| 5,922,996 A | 7/1999 | Ryeczek |
| 6,388,194 B1 | 5/2002 | Ryeczek |
| 6,596,943 B1 | 7/2003 | Ward |
| 6,646,206 B2 | 11/2003 | Ryeczek |
| 7,256,348 B1 | 8/2007 | Endacott |
| 2002/0170739 A1 | 11/2002 | Ryeczek |
| 2004/0137783 A1 | 7/2004 | Leith et al. |
| 2005/0109984 A1 | 5/2005 | Potyrailo et al. |
| 2005/0254551 A1 | 11/2005 | McClure et al. |
| 2007/0179252 A1 | 8/2007 | Lamberts et al. |
| 2008/0121171 A1 | 5/2008 | Hulsey |
| 2010/0234494 A1* | 9/2010 | Fischer .................. C09D 11/50 534/844 |
| 2010/0328019 A1 | 12/2010 | Darr et al. |
| 2011/0097948 A1 | 4/2011 | Melni |

(Continued)

FOREIGN PATENT DOCUMENTS

| | | |
|---|---|---|
| CN | 1164418 C | 9/2004 |
| DE | 102013007301 A1 | 10/2014 |

(Continued)

OTHER PUBLICATIONS

European Patent Office, Extended European Search Report issued in corresponding European application No. 17890336.5, dated Jul. 13, 2020, 11 pp.
State Intellectual Property Office of the P.R. China, International Search Report & Written Opinion issued in corresponding Application No. PCT/CN2017/070111, dated Sep. 27, 2017, 15 pp.
Alvey et al., "A Systematic Study of Thermochromic Aromatic Donor—Acceptor Materials," J. Org. Chem., 2010, vol. 75, pp. 7682-7690.
Wang et al., "Recent progress in VO2 smart coatings: Strategies to improve the thermochromic properties," Progress in Materials Science, vol. 81, 2016, pp. 1-54.
Zheng et al., "Preparation of thermochromic coatings and their energy saving analysis," Solar Energy, vol. 112, 2015, pp. 263-271.

(Continued)

*Primary Examiner* — Ling Siu Choi
*Assistant Examiner* — Ronald Grinsted
(74) *Attorney, Agent, or Firm* — Greenberg Traurig, LLP

(57) ABSTRACT

A thermochromic polymer composition including a base polymer material; a temperature sensitive material, which changes a color of the thermochromic polymer composition in response to a temperature change; and a stabilizer, which enhances stability performance of the thermochromic polymer composition. The thermochromic polymer composition which has a good thermochromic performance and good thermal performance and thus could provide a visible indication of the overheat condition. An electrical device is formed from the thermochromic polymer composition. A further embodiment of the process for preparing the thermochromic polymer composition and forming the electrical device.

20 Claims, 1 Drawing Sheet

(56) References Cited

U.S. PATENT DOCUMENTS

| | | |
|---|---|---|
| 2011/0248224 A1 | 10/2011 | Lucht et al. |
| 2015/0049992 A1 | 2/2015 | Bauco |
| 2016/0055725 A1 | 2/2016 | Kreiner et al. |
| 2017/0212159 A1 | 7/2017 | Kreiner et al. |
| 2017/0243675 A1 | 8/2017 | Prange et al. |

FOREIGN PATENT DOCUMENTS

| | | |
|---|---|---|
| FR | 2967258 A1 | 5/2012 |
| JP | 2006294625 A | 10/2006 |
| KR | 20080078160 A | 8/2008 |
| WO | 9610260 A1 | 4/1996 |
| WO | 0110635 A2 | 2/2001 |
| WO | 2009/113443 A1 | 9/2009 |

OTHER PUBLICATIONS

International Search Report and Written Opinion, issued by the United States Patent and Trademark Office, regarding corresponding patent application Serial No. PCT/US2018/012198; dated Mar. 18, 2018; 12 pages.

Extended European Search Report, issued by the European Patent Office, regarding corresponding patent application Serial No. EP 18736094.6; dated Jun. 20, 2018; 8 pages.

Second Office Action, issued by the China National Intellectual Property Administration, regarding corresponding patent application Serial No. CN 201880015879.3; dated May 7, 2021; 13 pages.

\* cited by examiner

THERMOCHROMIC POLYMER COMPOSITION, ELECTRICAL DEVICE, AND CORRESPONDING USE AND PROCESSES

FIELD OF THE INVENTION

The non-limiting and exemplary embodiments of the present disclosure generally relate to the field of polymer composition, and more particularly relate to a thermochromic polymer composition, an electrical device, use of the thermochromic polymer composition, a process for preparing the thermochromic polymer composition, and a process for forming the electrical device.

BACKGROUND OF THE INVENTION

This section introduces aspects that may facilitate a better understanding of the disclosure. Accordingly, the statements of this section are to be read in this light and are not to be understood as admissions about what is in the prior art or what is not in the prior art.

Electrical cables or wires are widely used electrical equipment in the various fields. Cable tie is a type of fastener for bundling items (primarily electric cables or wires) together. The cable tie has been extensively used in industrial applications in the past decades owing to its characteristics such as low cost, ease of use in tethering items together, etc.

In the electrical environment, it is rather important to monitor temperature since there might be an abnormal temperature indicating, for example, an electric overload condition in some environments. Therefore, an electrical device with a visual monitoring over the temperature will provide an added value to the electrical device such as a cable tie.

Thus, in the art, there is a need to provide a thermochromic indicator for electrical devices with a desirable performance.

SUMMARY OF THE INVENTION

Various embodiments of the present disclosure mainly aim at providing a thermochromic polymer composition to solve or at least partially mitigate at least a part of problems in the prior art. Other features and advantages of embodiments of the present disclosure will also be understood from the following description of specific embodiments when read in conjunction with the accompanying drawings, which illustrate, by way of example, the principles of embodiments of the present disclosure.

In a first aspect of the present disclosure, there is provided a thermochromic polymer composition. The thermochromic polymer composition may comprise a base polymer material; a temperature sensitive material, which changes a color of the thermochromic polymer composition in response to a temperature change; and a stabilizer, which enhances stability performance of the thermochromic polymer composition.

The stabilizer can be any type of stabilizer which can enhance the stability performance of the thermochromic polymer composition, especially the stability performance of the temperature sensitive material. However, in an embodiment of the present disclosure, the stabilizer comprises a heat stabilizer which can enhance heal stabilization performance of the temperature sensitive material. In another embodiment of the present disclosure, the stabilizer may comprise a light stabilizer, which can enhance outdoor stabilization performance, resistant to the UV light. In a further embodiment of the present disclosure, the stabilizer may comprise both the heat stabilizer and the light stabilizer.

According to a second aspect of the present disclosure, there is provided an electrical device comprising the thermochromic polymer composition of the first aspect. The electric device may comprise any one of, for example, a cable tie, a cable connector, a terminal connector, a splice connector, and a cable jacket.

According to a third aspect of the present disclosure, there is also provided a use of the thermochromic polymer composition of the first aspect in an electric device. The electric device may comprise any one of a cable tie, a cable connector, a terminal connector, a splice connector, a cable jacket and so on.

According to a fourth aspect of the present disclosure, there is further provided a process for preparing the thermochromic polymer composition of the first aspect. The method may comprise mixing the base polymer material, the temperature sensitive material and the stabilizer in a mechanical mixing process to obtain a mixed material; extruding the mixed material in an extrusion process to form an extrudant; and cutting the extrudant to obtain the thermochromic polymer composition as a masterbatch.

According to a fifth aspect of the present disclosure, there is further provided a process for forming an electric device from the thermochromic polymer composition as a masterbatch. The process may comprise mixing the thermochromic polymer composition as the masterbatch with a predetermined amount of base polymer material in a mechanical mixing process; and processing the mixed composition in a molding process to obtain the electrical device. The molding process may comprise any one of: an injection moulding, an extrusion moulding, a calender moulding, and a thermoforming moulding.

With embodiments of the present disclosure, it provides a new thermochromic formulation, which undergoes a rapid and obvious color change in response to the variations in temperature. Thus, it could provide a visual indication of the existence of abnormal temperature increases. In this way, users can be warned and accidents could be avoided at an early stage. Therefore, maintenance cost of the electrical device formed from this thermochromic polymer composition can be reduced, and scald at a hot surface could be avoided, and thus the electrical device may add an appealing value to customer applications.

BRIEF DESCRIPTION OF THE DRAWINGS

The above and other features of the present disclosure will become more apparent through detailed explanation on the embodiments as illustrated in the description with reference to the accompanying drawings, throughout which like reference numbers represent same or similar components and wherein.

DETAILED DESCRIPTION OF EMBODIMENTS

Figure 1:
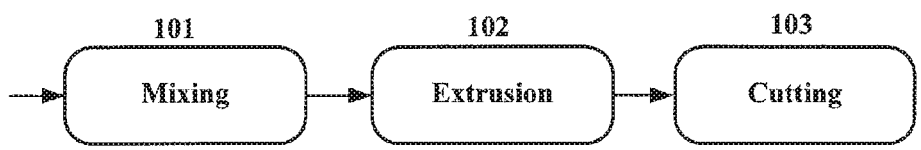
FIG. 1 schematically illustrates a flow chart of a process for preparing the thermochromic polymer composition as a masterbatch according to an embodiment of the present disclosure.

Hereinafter, the principle and spirit of the present disclosure will be described with reference to illustrative embodiments. It shall be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

In order to provide a visible indication of overheat condition, a color change performance with the temperature variation is desirable. It is known that thermochromic materials can change color as a function of temperature, typically by reflecting different portions of white light. The thermochromic materials may include for example, pigment, ink, paint, particles, or other substance sensitive to a temperature change. A thermochromic indicator was usually employed by coated materials on exterior surface of the device. The coated materials have benefits of easy processing and forming. However, it might also bring problems, such as long-term instability, and weak resistance to environment and the like. Thus, in the present disclosure, there is provided a new thermochromic formulation, which can be used for, but not limited to, electrical devices.

In an embodiment of the present disclosure, there is provided a thermochromic formulation, which is also called as the thermochromic polymer material, may include a base polymer material, a temperature sensitive material, and a stabilizer. The base polymer material is a polymer matrix, which may be any type of polymer suitable for the object electrical device (such as cable tie, a cable connector, a terminal connector, a splice connector, a cable jacket, etc.). The temperature sensitive material can be a thermochromic pigment, which can be a type of microcapsule protected pigment and have reversible or semi-reversible color change property. The stabilizer may include for example, heat stabilizer like antioxidant stabilizer, a light stabilizer or both thereof so as to enhance stability performance and/or the thermochromic polymer composition.

The weight ratio of the temperature sensitive material to the total stabilizer may be from 1:0.1 to 1:10, and preferably, 1:1 to 1:6.

In an embodiment of the present disclosure, the base polymer composition may comprise any one or more of polypropylene (PP), polyamide (PA, nylon), polytetrafluoroethylene (PTFE, Teflon), poly(ethene-co-tetrafluoroethene) (ETFE, Tefzel), polyetheretherketone (PEEK), poly(chlorotrifluoroethylene-ethylene) (ECTFE), polyethylene (PE), acetal, thermoplastic polyurethane (TPU), polyvinyl chloride (PVC), polyethylene terephthalate (PET), polyvinylidene difluoride (PVDF), copolymers thereof, or combination thereof.

The temperature sensitive material may comprise one or more temperature sensitive materials with a semi-reversible or reversible color change. The one or more temperature sensitive materials with a semi-reversible or reversible color change may have one or more threshold temperatures ranging from about −10° C. to about 70° C. For an electrical device such as cable tie, it is intended to indicate a temperature increase that has a scald hazardous to the human skin touch. According to American Burn Association, 49° C. (120° F.) is recommended as the temperature that could cause skin scald in short contact. Thus, in this case, 49° C. may be determined as the threshold temperature for the thermochromic polymer material. A series of microcapsule protected color-changing pigments with comparable threshold temperature was selected and examined. In an example of the present disclosure, the "Green-Colorless" pigment provided by New Prismatic Enterprise Co., Ltd. can be used as the desired color-changing pigment.

The stabilizer can be employed as auxiliary ingredients to the temperature sensitive material. The added stabilizer is used to keep the microcapsuled pigment stable especially during the high-temperature process of injection molding, and facilitate the color change sensitivity of the resulted electric device such as a cable tie.

The heat stabilizer may comprise any one or more of a hindered phenol antioxidant, a phosphite ester antioxidant and a thiosynergist material. The hindered phenol antioxidant comprises any one or more of pentacrythritol tetrakys 3-(3,5-ditert-butyl-4-hydroxyphenyl) propionate (Irganox1010), dibutylhydroxyphenylpropionic acid stearyl ester (Irganox1076), 2,6-Di-tert-butyl-4-methylphenol (Irganox264), and calcium bis(monoethyl (3,5-di-tert-butyl-4-hydroxylbenzyl)phosphonate) (Irganox1425). The phosphite ester antioxidant comprises any one or more of tris(2,4-di-t-butylphenyl)phosphite (Irgafos 168), and bis-(2,4-di-tert-butyl-pheny)-phosphiterythritol diphosphite (Ultranox 626). The thiosynergist materials comprises 2,4-bis(dodecylthiomethyl)-6-methylphenol (RC1726), and 2-Methyl-4,6-bis((octylthio) methyl)phenol (Irganox 1520).

Another possible alternative or additional additive is the light stabilizer which may enhance the stability performance when the polymer material is used outdoor. The light stabilizer may comprise any one or more of an ultraviolet light screening agent, an ultraviolet absorbent, a light quenching agent, and a radical scavenger. The ultraviolet light screening agent may comprise one or more of carbon black, zinc oxide, and titanium dioxide. The ultraviolet absorbent may comprise for example benzophenone, benzotriazole, and triazine. The light quenching agent may comprise any one or more of, for example, nickel compounds; wherein the radical scavenger comprises one or more of bis(2,2,6,6-tetramethyl-4-piperidyl) sebacate, benzoic acid (2,2,6,6-tetramethyl-4-piperidine) ester, etc.

A total amount of the temperature sensitive material is important for the resulting thermochromic polymer material to obtain a desired color change. In one embodiment of the present disclosure, for the thermochromic polymer composition as a masterbatch, the temperature sensitive material may range from about 1 wt % to about 30 wt %, based on the total weight of the thermochromic polymer composition. In another embodiment of the present disclosure, for the thermochromic polymer composition as a final composition formed from a masterbatch, a total amount of the temperature sensitive material may be from about 0.01 wt % to about 20%, preferably from about 0.1 wt % to about 10 wt %, and more preferably about 1 wt % to about 5 wt %, based on the total weight of the thermochromic polymer composition.

In addition, inventors observed that the color change performance had close correlation to content of the stabilizer. In an embodiment of the present disclosure, for the thermochromic polymer composition as a masterbatch, a total amount of the stabilizer may range from about 1 wt % to about 30 wt %, and preferably about 1 wt % to about 5 wt %, based on the total weight of the thermochromic polymer composition. Whereas, for the thermochromic polymer composition as a final composition formed from a masterbatch, a total amount of the stabilizer may range from about 0.01 wt % to about 20%, preferably from about 0.1 wt % to about 10%, and more preferably about 1 wt % to about 5 wt %, based on the total weight of the thermochromic polymer composition.

In another aspect, there is further provided an electrical device comprising the thermochromic polymer composition as provided herein. The electrical device can be, for example, any one of a cable tie, a cable connector, a terminal connector, a splice connector, a cable jacket, etc. However, these example electrical devices are only given for illustrative purposes and the present disclosure is not limited thereto, the thermochromic polymer composition can be used to form other electrical device than those listed.

In a further aspect, there is also provided a use of the thermochromic polymer composition as provided herein in an electric device. The electric device may comprise use in any one of a cable tie, a cable connector, a terminal connector, a splice connector, and a cable jacket. However, the skilled in the art shall understand that these example uses are only given for illustrative purposes and the present disclosure is not limited thereto, the thermochromic polymer composition can also be used to form other electrical device than those listed, or any other devices.

In a further aspect, there is provided a process for preparing the thermochromic polymer composition as provided herein. For illustrative purposes, reference will be made to FIG. 1 to describe the preparation process, wherein FIG. 1 illustrates an example process for preparing the thermochromic polymer composition according to an embodiment of the present disclosure.

As illustrated in FIG. 1, the process 100 may start from a mixing sub-process 101, in which the base polymer material, the temperature sensitive material and the stabilizer are mixed together in a mechanical mixing process to obtain a mixture. Then, in an extrusion sub-process 102, the mixture may be further extruded in an extrusion process to form an extrudant. In a cutting sub-process, the extrudant may be then cut into small pellets to obtain the thermochromic polymer composition as a masterbatch. In such a way, it is possible to obtain the masterbatch, which can be further diluted by the base polymer material to form the final electrical product as desired, like a cable tie, a cable connector, a terminal connector, a splice connector, and a cable jacket.

Figure 2:
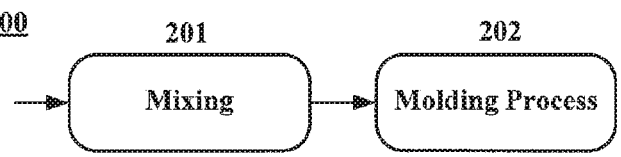
FIG. 2 schematically illustrates a flow chart of a process for forming an electric device from the thermochromic polymer composition as a masterbatch according to an embodiment of the present disclosure.

Hereinafter, a process for forming an electric device from the masterbatch will be described with reference to FIG. 2, which schematically illustrates a flow chart of a process for forming an electric device from the thermochromic polymer composition as a masterbatch according to an embodiment of the present disclosure. As illustrated in FIG. 2, the process 200 may start from a mixing sub-process 201, in which the thermochromic polymer composition as a masterbatch is mixed with a predetermined amount of base polymer material in a mechanical mixing process. Then, in a molding sub-process 202, the mixed composition can be processed to obtain the final electrical device. The molding sub-process 202 may comprise any one of: an injection moulding, an extrusion moulding, a calender moulding, and a thermoforming moulding, which can be selected based on requirements of different cases. In the process 200, the electric device may comprise any one of a cable tie, a cable connector, a terminal connector, a splice connector, a cable jacket or any other electrical device.

Hereinafter, examples of the thermochromic polymer composition will be described to examine its technical effect. Through the examples and test result comparisons, the skilled in the art will realize technical effects of the thermochromic polymer composition as provided in the present disclosure. In the following, tests are performed on example electrical devices, i.e., cable ties to show the effect of the thermochromic polymer composition. However, it shall be noted that all these examples are given for illustrative purposes and are not intended to limit the present disclosure in any way. For example, the electrical device can also be any other electrical device like a cable connector, a terminal connector, a splice connector, or a cable jacket in addition to the cable tie.

EXAMPLES

1. Samples Preparation 1.1 Masterbatch Preparation:

The mixing of PP pellets (SD-242) and temperature sensitive fillers were carried out with a GH-10DY high-speed mixer from Beijing INT Plastics Machinery General Factory. Then, the masterbatch was prepared by using a SK-26 twin-screw extruder (its screw diameter was 26 mm; its screw L/D ratio was 44) from Keya Chemical Industry Complete Equipment Co., Ltd, the content of temperature sensitive fillers in PP matrix was in a range of 1 wt to 30 wt %. The extrusion temperature was in a range of 180-280° C.

1.2 Cable Tie Production

The resulted masterbatch pellets were further diluted by pure PP pellets (the diluted temperature sensitive content was in a range of 0.01 wt-20 wt %). Then, the cable tie samples were produced by diluted pellets in an injection molding. The injection was performed by using a PT-130 injection machine (its screw diameter is 40 mm, its screw UD ratio is 22.5) from L.K. machinery Co., Ltd. The injection temperature was in a range of 180° C.-300° C.

2. Color Changing-Test

Color changing-tests were performed on a SmartLab HP-303DU hot-plate with size 300 mm×300 mm×10 mm (the temperature fluctuation was about ±0.1° C.). Thermochromic cable tie samples were put on the middle part of the hot-plate when heating up the hot-plate. The hot-plate was placed in a black photo cabin to prevent heat turbulence from the atmosphere. The heating or cooling rate was around 0.5° C./min. During the heating or cooling process, pictures were taken for every degree centigrade of temperature change to record the color changing phenomenon.

3. Thermal Analysis Measurement

The thermal analysis measurements were performed by means of DSC (differential scanning calorimetry) measurement to measure the melting temperature (Tm) and the crystallization temperature (Tc). For a DSC measurement, a sample (about 5 to 10 mg) was heated from about 40° C. to about 210° C. at a scanning rate of 50° C./min under a nitrogen atmosphere, and was held there for 5 minutes to eliminate the thermal history. Then the sample was cooled to 40° C. at a scanning rate of 10° C./min to examine its crystallization behavior. In addition, the sample was also heated at a scanning rate of 10° C./min to test its melting behavior.

4. Specific Examples

In order to test the color-changing performance and the thermal performance, Examples 1 to 29 were prepared, which were cable ties produced from a masterbatch by means of the process as described in section "1. Samples preparation."

The example cable ties as provided in these Examples were intended to indicate temperature increase that had scald hazardous to the human skin touch. According to American Burn Association, 49° C. (120° F.) is recommended as the temperature that could cause skin scald in short contact. Thus, in these examples, 49° C. was determined as the threshold temperature for the thermochromic formulation. A series of microcapsule protected color-changing pigments with comparable threshold temperature were selected and examined. The "Green-Colorless" pigment provided by New Prismatic Enterprise Co., Ltd. was finally confirmed as an example desired color-changing pigment. However, it shall be appreciated that the present disclosure is not only limited to this pigment and it is also possible to use any other pigment with any color.

4.1 Example Group 1 (Examples 1 to 11)

Example Group 1 included eleven examples, i.e., Examples 1 to 11. In Example Group 1, the pigment content was about 1 wt % based on the total weight of the cable tie.

In Example 1, the thermochromic polymer composition contained a base polymer material of polypropylene (PP, SD-242), a "Green-Colorless" pigment (as a temperature sensitive material) provided by New Prismatic Enterprise Co., Ltd., and a heat stabilizer which was antioxidant Irganox1010 which had a hindered phenolic molecular structure.

In the cable tie, the pigment was about 1 wt %, and the antioxidant Irganox1010 was about 1 wt % based on the total weight of the cable tie.

Examples 2 to 4 were similar to Example 1 except that the antioxidant Irganox1010 had different contents. In Example 2, the antioxidant Irganox1010 was about 3 wt % based on the total weight of the cable tie; in Example 3, the antioxidant Irganox1010 was about 5 wt % based on the total weight of the cable tie; and in Example 4, the antioxidant Irganox1010 was about 10 wt % based on the total weight of the cable tie. The contents of respective ingredients of Examples 1 to 4 are given in Table 1.

TABLE 1

Contents of respective ingredients of Examples 1 to 4

| No. | Ingredients | Pigment content | 1010 content | UV-001 content |
|---|---|---|---|---|
| Example 1 | PP/Pigment/1010 | 1 wt % | 1 wt % | — |
| Example 2 | PP/pigment/1010 | 1 wt % | 3 wt % | — |
| Example 3 | PP/pigment/1010 | 1 wt % | 5 wt % | — |
| Example 4 | PP/pigment/1010 | 1 wt % | 10 wt % | — |

In Example 5, the thermochromic polymer composition contained a base polymer material of polypropylene (PP, SD-242), a "Green-Colorless" pigment (as a temperature sensitive material) provided by New Prismatic Enterprise Co., Ltd., and a light stabilizer UV-001 which had a hindered amine molecular structure.

In the cable tie, the pigment was about 1 wt %, and the light stabilizer UV-001 was about 1 wt % based on the total weight of the cable tie.

Examples 6 to 8 were similar to Example 5 except that the light stabilizer UV-001 had different contents. In Example 6, the light stabilizer UV-001 was about 3 wt % based on the total weight of the cable tie; in Example 7, the light stabilizer UV-001 was about 5 wt % based on the total weight of the cable tie; and in Example 8, the light stabilizer UV-001 was about 10 wt % based on the total weight of the cable tie. The contents of respective ingredients of Examples 5 to 8 are given in Table 2.

TABLE 2

Contents of respective ingredients of Examples 5 to 8

| No | Ingredients | Pigment content | 1010 content | UV-001 content |
|---|---|---|---|---|
| Example 5 | PP/Pigment/UV-001 | 1 wt % | — | 1 wt % |
| Example 6 | PP/pigment/UV-001 | 1 wt % | — | 3 wt % |
| Example 7 | PP/pigment/UV-001 | 1 wt % | — | 5 wt % |
| Example 8 | PP/pigment/UV-001 | 1 wt % | — | 10 wt % |

In Example 9, the thermochromic polymer composition contained a base polymer material of polypropylene (PP, SD-242), a "Green-Colorless" pigment (as a temperature sensitive material) provided by New Prismatic Enterprise Co., Ltd., antioxidant Irganox1010 (as a heat stabilizer) which had a hindered phenolic molecular structure, and a light stabilizer UV-001 which had a hindered amine molecular structure.

In the cable tie, the pigment was about 1 wt %, the antioxidant Irganox1010 was about 0.5 wt % and the light stabilizer UV-001 was about 0.5 wt % based on the total weight of the cable tie.

Examples 10 to 11 were similar to Example 9 except that the antioxidant Irganox1010 and the light stabilizer UV-001 had different contents. In Example 10, the antioxidant Irganox1010 was about 1 wt % and the light stabilizer UV-001 was about 1 wt % based on the total weight of the cable tie; and in Example 11, the antioxidant Irganox1010 was about 3 wt % and the light stabilizer UV-001 was about 3 wt % based on the total weight of the cable tie. The contents of respective ingredients of Examples 9 to 11 are given in Table 3.

TABLE 3

Contents of respective ingredients of Examples 9 to 11

| No | Ingredients | Pigment content | 1010 content | UV-001 content |
|---|---|---|---|---|
| Example 9 | PP/Pigment/1010 + UV-001 | 1 wt % | 0.5 wt % | 0.5 wt % |
| Example 10 | PP/Pigment/1010 + UV-001 | 1 wt % | 1 wt % | 1 wt % |
| Example 11 | PP/Pigment/1010 + UV-001 | 1 wt % | 3 wt % | 3 wt % |

4.2 Example Group 2 (Examples 12 to 17)

Example Group 2 includes six examples, i.e., Examples 12 to 17. In Example Group 2, the pigment content was about 3 wt % based on the total weight of the cable tie.

In Example 12, the thermochromic polymer composition contained a base polymer material of polypropylene (PP, SD-242), a "Green-Colorless" pigment (as a temperature sensitive material) provided by New Prismatic Enterprise Co., Ltd., and antioxidant Irganox1010 (as a heat stabilizer) which had a hindered phenolic molecular structure.

In the cable tie, the pigment was about 3 wt %, and the antioxidant Irganox1010 was about 1 wt % based on the total weight of the cable tie.

Example 13 was similar to Example 12 except that the antioxidant Irganox1010 had a different content. In Example 13, the antioxidant Irganox1010 was about 5 wt % based on the total weight of the cable tie. The contents of respective ingredients of Examples 12 to 13 are given in Table 4.

TABLE 4

Contents of respective ingredients of Examples 12 to 13

| No | Ingredients | Pigment content | 1010 content | UV-001 content |
|---|---|---|---|---|
| Example 12 | PP/pigment/1010 | 3 wt % | 1 wt % | — |
| Example 13 | PP/pigment/1010 | 3 wt % | 5 wt % | — |

In Example 14, the thermochromic polymer composition contained a base polymer material of polypropylene (PP, SD-242), a "Green-Colorless" pigment (as a temperature sensitive material) provided by New Prismatic Enterprise Co., Ltd., and a light stabilizer UV-001 which had a hindered amine molecular structure.

In the cable tie, the pigment was about 3 wt %, and the light stabilizer UV-001 was about 1 wt % based on the total weight of the cable tie.

Example 15 was similar to Example 14 except that the light stabilizer UV-001 had a different content. In Example 15, the light stabilizer UV-001 was about 5 wt % based on the total weight of the cable tie. The contents of respective ingredients of Examples 14 to 15 are given in Table 5.

TABLE 5

Contents of respective ingredients of Examples 14 to 15

| No | Ingredients | Pigment content | 1010 content | UV-001 content |
|---|---|---|---|---|
| Example 14 | PP/pigment/1010 | 3 wt % | — | 1 wt % |
| Example 15 | PP/pigment/1010 | 3 wt % | — | 5 wt % |

In Example 16, the thermochromic polymer composition contained a base polymer material of polypropylene (PP, SD-242), a "Green-Colorless" pigment (as a temperature sensitive material) provided by New Prismatic Enterprise Co., Ltd., antioxidant Irganox1010 (as a heat stabilizer) which had a hindered phenolic molecular structure, and a light stabilizer UV-001 which had a hindered amine molecular structure.

In the cable tie, the pigment was about 3 wt %, the antioxidant Irganox1010 was about 0.5 wt % and the light stabilizer UV-001 was about 0.5 wt % based on the total weight of the cable tie.

Example 17 was similar to Example 16 except that the antioxidant Irganox1010 and the light stabilizer UV-001 had different contents. In Example 17, the antioxidant Irganox1010 was about 3 wt % and the light stabilizer UV-001 was about 3 wt % based on the total weight of the cable tie. The contents of respective ingredients of Examples 16 to 17 are given in Table 6.

TABLE 6

Contents of respective ingredients of Examples 16 to 17

| No | Ingredients | Pigment content | 1010 content | UV-001 content |
|---|---|---|---|---|
| Example 16 | PP/pigment/1010 + UV-001 | 3 wt % | 0.5 wt % | 0.5 wt % |
| Example 17 | PP/pigment/1010 + UV-001 | 3 wt % | 3 wt % | 3 wt % |

4.3 Example Group 3 (Examples 18 to 21)

Example Group 3 included four examples, i.e., Examples 18 to 21. In Example Group 3, the pigment content was about 5 wt % based on the total weight of the cable tie.

In Example 18, the thermochromic polymer composition contained a base polymer material of polypropylene (PP, SD-242), a "Green-Colorless" pigment (as a temperature sensitive material) provided by New Prismatic Enterprise Co., Ltd., and antioxidant Irganox1010 (as a heat stabilizer) which had a hindered phenolic molecular structure.

In the cable tie, the pigment was about 5 wt %, and the antioxidant Irganox1010 was about 5 wt/o based on the total weight of the cable tie. The contents of respective ingredients of Example 18 are given in Table 7.

TABLE 7

Contents of respective ingredients of Example 18

| No | Ingredients | Pigment content | 1010 content | UV-001 content |
|---|---|---|---|---|
| Example 18 | PP/pigment/1010 | 5 wt % | 5 wt % | — |

In Example 19, the thermochromic polymer composition contained a base polymer material of polypropylene (PP, SD-242), a "Green-Colorless" pigment (as a temperature sensitive material) provided by New Prismatic Enterprise Co., Ltd., and a light stabilizer UV-001 which had a hindered amine molecular structure.

In the cable tie, the pigment was about 5 wt %, and the light stabilizer UV-001 was about 5 wt % based on the total weight of the cable tie. The contents of respective ingredients of Example 19 are given in Table 8.

TABLE 8

Contents of respective ingredients of Example 19

| No | Ingredients | Pigment content | 1010 content | UV-001 content |
|---|---|---|---|---|
| Example 19 | PP/pigment/1010 | 5 wt % | — | 5 wt % |

In Example 20, the thermochromic polymer composition contained a base polymer material of polypropylene (PP, SD-242), a "Green-Colorless" pigment (as a temperature sensitive material) provided by New Prismatic Enterprise Co., Ltd., antioxidant Irganox1010 (as a heat stabilizer) which had a hindered phenolic molecular structure, and a light stabilizer UV-001 which had a hindered amine molecular structure.

In the cable tie, the pigment was about 5 wt %, the antioxidant Irganox1010 was about 2.5 wt % and the light stabilizer UV-001 was about 2.5 wt % based on the total weight of the cable tie.

Example 21 was similar to Example 20 except that the antioxidant Irganox1010 and the light stabilizer UV-001 had different contents, wherein in Example 21, the antioxidant Irganox1010 was about 5 wt % and the light stabilizer UV-001 was about 5 wt % based on the total weight of the cable tie. The contents of respective ingredients of Examples 20 and 21 are given in Table 9.

TABLE 9

Contents of respective ingredients of Examples 20 to 21

| No | Ingredients | Pigment content | 1010 content | UV-001 content |
|---|---|---|---|---|
| Example 20 | PP/pigment/1010 + UV-001 | 5 wt % | 2.5 wt % | 2.5 wt % |
| Example 21 | PP/pigment/1010 + UV-001 | 5 wt % | 5 wt % | 5 wt % |

4.4 Example Group 4 (Example 22 to 25)

In Example Group 4, the pigment content was about 0.1 wt % based on the total weight of the cable tie and it included Examples 22 to 25.

In Example 22, the thermochromic polymer composition contained a base polymer material of polypropylene (PP, SD-242), a "Green-Colorless" pigment (as a temperature sensitive material) provided by New Prismatic Enterprise Co., Ltd., and antioxidant Irganox1010 (as a heat stabilizer) which had a hindered phenolic molecular structure.

In the cable tie, the pigment was about 0.1 wt %, and the antioxidant Irganox1010 was about 0.1 wt % based on the total weight of the cable tie. The contents of respective ingredients of Example 22 are given in Table 10.

TABLE 10

Contents of respective ingredients of Example 22

| No | Ingredients | Pigment content | 1010 content | UV-001 content |
|---|---|---|---|---|
| Example 22 | PP/pigment/1010 | 0.1 wt % | 0.1 wt % | — |

In Example 23, the thermochromic polymer composition contained a base polymer material of polypropylene (PP, SD-242), a "Green-Colorless" pigment (as a temperature sensitive material) provided by New Prismatic Enterprise Co., Ltd., and a light stabilizer UV-001 which had a hindered amine molecular structure.

In the cable tie, the pigment was about 0.1 wt %, the light stabilizer UV-001 was about 0.1 wt % based on the total weight of the cable tie. The contents of respective ingredients of Example 23 are given in Table 11.

TABLE 11

Contents of respective ingredients of Example 23

| No | Ingredients | Pigment content | 1010 content | UV-001 content |
|---|---|---|---|---|
| Example 23 | PP/pigment/1010 | 0.1 wt % | — | 0.1 wt % |

In Example 24, the thermochromic polymer composition contained a base polymer material of polypropylene (PP, SD-242), a "Green-Colorless" pigment (as a temperature sensitive material) provided by New Prismatic Enterprise Co., Ltd., antioxidant Irganox1010 (as a heat stabilizer) which had a hindered phenolic molecular structure, and a light stabilizer UV-001 which had a hindered amine molecular structure.

In the cable tie, the pigment was about 0.1 wt %, the antioxidant Irganox1010 was about 0.1 wt % and the light stabilizer UV-001 was about 0.1 wt % based on the total weight of the cable tie.

Example 25 was similar to Example 24 except that the antioxidant Irganox1010 and the light stabilizer UV-001 had different contents. In Example 21, the antioxidant Irganox1010 was about 0.5 wt % and the light stabilizer UV-001 was about 0.5 wt % based on the total weight of the cable tie. The contents of respective ingredients of Examples 24 and 25 are given in Table 12.

TABLE 12

Contents of respective ingredients of Examples 24 to 25

| No | Ingredients | Pigment content | 1010 content | UV-001 content |
|---|---|---|---|---|
| Example 24 | PP/pigment/1010 + UV-001 | 0.1 wt % | 0.1 wt % | 0.1 wt % |
| Example 25 | PP/pigment/1010 + UV-001 | 0.1 wt % | 0.5 wt % | 0.5 wt % |

4.5 Example Group 5 (Examples 26 to 29)

Example Group 5 included four examples, i.e., Examples 26 to 29. In Example Group 5, the pigment content was about 10 wt % based on the total weight of the cable tie.

In Example 26, the thermochromic polymer composition contained a base polymer material of polypropylene (PP, SD-242), a "Green-Colorless" pigment (as a temperature sensitive material) provided by New Prismatic Enterprise Co., Ltd., and antioxidant Irganox1010 (as a heat stabilizer) which had a hindered phenolic molecular structure.

In the cable tie, the pigment was about 10 wt %, and the antioxidant Irganox1010 was about 10 wt % based on the total weight of the cable tie. The contents of respective ingredients of Example 26 are given in Table 13.

TABLE 13

Contents of respective ingredients of Example 26

| No | Ingredients | Pigment content | 1010 content | UV-001 content |
|---|---|---|---|---|
| Example 26 | PP/pigment/1010 | 10 wt % | 10 wt % | — |

In Example 27, the thermochromic polymer composition contained a base polymer material of polypropylene (PP, SD-242), a "Green-Colorless" pigment (as a temperature sensitive material) provided by New Prismatic Enterprise Co., Ltd., and a light stabilizer UV-001 which had a hindered amine molecular structure.

In the cable tie, the pigment was about 10 wt %, and the light stabilizer UV-001 was about 10 wt % based on the total weight of the cable tie. The contents of respective ingredients of Example 27 are given in Table 14.

TABLE 14

Contents of respective ingredients of Example 27

| No | Ingredients | Pigment content | 1010 content | UV-001 content |
|---|---|---|---|---|
| Example 27 | | 10 wt % | 10 wt % | — | 10 wt % |

In Example 28, the thermochromic polymer composition contained a base polymer material of polypropylene (PP, SD-242), a "Green-Colorless" pigment (as a temperature sensitive material) provided by New Prismatic Enterprise Co., Ltd., antioxidant Irganox1010 (as a heat stabilizer) which had a hindered phenolic molecular structure, and a light stabilizer UV-001 which had a hindered amine molecular structure.

In the cable tie, the pigment was about 10 wt %, the antioxidant Irganox1010 was about 5 wt % and the light stabilizer UV-001 was about 5 wt % based on the total weight of the cable tie.

Example 29 was similar to Example 28 except that the antioxidant Irganox1010 and the light stabilizer UV-001 had different contents. In Example 29, the antioxidant Irganox1010 was about 10 wt % and the light stabilizer UV-001 was about 10 wt % based on the total weight of the cable tie. The contents of respective ingredients of Examples 28 and 29 are given in Table 15.

TABLE 15

Contents of respective ingredients of Examples 28 to 29

| No | Ingredients | Pigment content | 1010 content | UV-001 content |
|---|---|---|---|---|
| Example 28 | PP/pigment/1010 + UV-001 | 10 wt % | 5 wt % | 5 wt % |
| Example 29 | PP/pigment/1010 + UV-001 | 10 wt % | 10 wt % | 10 wt % |

5. Comparison Cases

In order to show the effect of examples of the thermochromic polymer compositions as provided in the present disclosure, six comparison cases are prepared, wherein in Case 1 to 5, only pigment was added into the PP and in Case 6, the composition was pure PP. In cases 1 to 5, the pigments are about 1 wt %, 3 wt %, 5 wt %, 0.1 wt % and 10 wt %, respectively, based on the total weight of the cable tie, which respectively had similar pigment contents to those examples in Example Groups 1 to 5.

TABLE 16

Contents of respective ingredients of comparison cases

| No | Ingredients | Pigment content | 1010 content | UV-001 content |
|---|---|---|---|---|
| Case 1 | PP/pigmen1 | 1 wt % | — | — |
| Case 2 | PP/pigmen1 | 3 wt % | — | — |
| Case 3 | PP/pigmen1 | 5 wt % | — | — |
| Case 4 | PP/pigmen1 | 0.1 wt % | — | — |
| Case 5 | PP/pigmen1 | 10 wt % | — | — |
| Case 6 | Pure PP | — | — | — |

6. Test Results 6.1 Color Change Test Results

The color-changing tests were performed on the above Example Groups 1 to 5 and Cases 1 to 5 under test conditions as described in section "2. Color-changing test."

Regarding Example Group 1 having a pigment content of 1 wt % and Case 1 also having a pigment content of 1 wt % based on the total weight of the cable tie, their color color-changing test results are illustrated in Table 17.

TABLE 17

Color-changing test results of Example Group 1 and Case 1

| | Heating | | Cooling | |
|---|---|---|---|---|
| No. | Start | Finish | Start | Finish |
| Example 1 | 47° C. | 49° C. | 47° C. | 45° C. |
| Example 2 | 47° C. | 49° C. | 47° C. | 45° C. |
| Example 3 | 47° C. | 49° C. | 47° C. | 46° C. |
| Example 4 | 48° C. | 50° C. | 48° C. | 46° C. |
| Example 5 | 48° C. | 49° C. | 47° C. | 46° C. |
| Example 6 | 48° C. | 49° C. | 47° C. | 46° C. |
| Example 7 | 47° C. | 49° C. | 46° C. | 45° C. |
| Example 8 | 48° C. | 49° C. | 47° C. | 46° C. |
| Example 9 | 48° C. | 50° C. | 48° C. | 46° C. |
| Example 10 | 47° C. | 49° C. | 47° C. | 45° C. |
| Example 11 | 47° C. | 49° C. | 47° C. | 45° C. |
| Case 1 | 54° C. | 97° C. | 95° C. | 52° C. |

From the above color-changing test results, it can be seen that each of Examples 1 to 11 had a rapid and obvious color change at a temperature near a required threshold temperature 49° C. By contrast, Case 1 had a rather long color change process, which was rather slow responsive to temperature change. Thus, it is very hard for Case 1 to be used to indicate that the temperature reaches a predetermined temperature threshold, while Examples 1 to 11 had a good color changing performance, which could provide a visual indication of overheat condition and a warning of hazard.

Regarding Example Group 2 having a pigment content of 3 wt % and Case 2 also having a pigment content of 3 wt % based on the total weight of the cable tie, their color color-changing test results are illustrated in Table 18.

TABLE 18

Color-changing test results of Example Group 2 and Case 2

| No. | Heating | | Cooling | |
| --- | --- | --- | --- | --- |
| | Start | Finish | Start | Finish |
| Example 12 | 48° C. | 50° C. | 47° C. | 45° C. |
| Example 13 | 48° C. | 50° C. | 48° C. | 46° C. |
| Example 14 | 48° C. | 49° C. | 47° C. | 46° C. |
| Example 15 | 49° C. | 50° C. | 48° C. | 46° C. |
| Example 16 | 48° C. | 50° C. | 48° C. | 46° C. |
| Example 17 | 48° C. | 50° C. | 47° C. | 46° C. |
| Case 2 | 55° C. | 98° C. | 96° C. | 53° C. |

From the above color-changing test results, it can be seen that each of Examples 12 to 17 also had a rapid and obvious color change at a temperature near a required threshold temperature 49° C. However, Case 3 had a rather long color change process, which was rather slow responsive to temperature change.

Regarding Example Group 3 having a pigment content of 5 wt % and Case 3 also having a pigment content of 5 wt % based on the total weight of the cable tie, their color color-changing test results are illustrated in Table 19.

TABLE 19

Color-changing test results of Example Group 3 and Case 3

| No. | Heating | | Cooling | |
| --- | --- | --- | --- | --- |
| | Start | Finish | Start | Finish |
| Example 18 | 48° C. | 51° C. | 48° C. | 46° C. |
| Example 19 | 49° C. | 51° C. | 48° C. | 46° C. |
| Example 20 | 49° C. | 51° C. | 47° C. | 46° C. |
| Example 21 | 48° C. | 51° C. | 48° C. | 46° C. |
| Case 3 | 55° C. | 100° C. | 98° C. | 54° C. |

From the above color-changing test results, it can be seen that each of Examples 18 to 21 also had a rapid and obvious color change at a temperature near a required threshold temperature 49° C. However, Case 2 had a rather long color change process, which was rather slow responsive to temperature change.

Regarding Example Group 4 having a pigment content of 0.1 wt % and Case 4 also having a pigment content of 0.1 wt % based on the total weight of the cable tie, their color color-changing test results are illustrated in Table 20.

TABLE 20

Color-changing test results uf Example Group 4 and Case 4

| No. | Heating | | Cooling | |
| --- | --- | --- | --- | --- |
| | Start | Finish | Start | Finish |
| Example 22 | 46° C. | 48° C. | 46° C. | 45° C. |
| Example 23 | 47° C. | 48° C. | 47° C. | 46° C. |
| Example 24 | 47° C. | 49° C. | 47° C. | 45° C. |
| Example 25 | 47° C. | 49° C. | 47° C. | 45° C. |
| Case 4 | 52° C. | 96° C. | 94° C. | 51° C. |

From the above color-changing test results, it can be seen that each of Examples 22 to 25 also had a rapid and obvious color change at a temperature near a required threshold temperature 49° C. even though the pigment content is as low as 0.1 wt. However, Case 4 had a rather long color change process, which was rather slow responsive to temperature change.

Regarding Example Group 5 having a pigment content of 10 wt % and Case 5 also having a pigment content of 10 wt % based on the total weight of the cable tie, their color color-changing test results are illustrated in Table 21.

TABLE 21

Color-changing test results of Example Group 5 and Case 5

| No. | Heating | | Cooling | |
| --- | --- | --- | --- | --- |
| | Start | Finish | Start | Finish |
| Example 26 | 49° C. | 52° C. | 49° C. | 47° C. |
| Example 27 | 50° C. | 51° C. | 49° C. | 47° C. |
| Example 28 | 49° C. | 51° C. | 48° C. | 46° C. |
| Example 29 | 50° C. | 52° C. | 49° C. | 47° C. |
| Case 5 | 57° C. | 101° C. | 100° C. | 55° C. |

From the above color-changing test results, it can be seen that each of Examples 26 to 29 also had a rapid and obvious color change at a temperature near a required threshold temperature 49° C. even though the pigment content is as low as 0.1 wt. However, Case 5 had a rather long color change process, which was rather slow responsive to temperature change.

6.2 Thermal Parameters Obtained by DSC Measurement

The thermal performance tests were performed on Examples 1 to 29 and Case 6 (pure PP) under test conditions as described in the section "3. Thermal analysis measurement".

Regarding Example Group 1 and Case 6, the thermal performance test results are illustrated in Table 22.

TABLE 22

Thermal performance test results of Example Group 1 and Case 6

| No. | Thermal parameters | |
| --- | --- | --- |
| | $T_m$ (° C.) | $T_c$ (° C.) |
| Example 1 | 165.9 | 117.3 |
| Example 2 | 166.0 | 116.1 |
| Example 3 | 166.0 | 123.6 |
| Example 4 | 166.1 | 125.0 |
| Example 5 | 166.3 | 124.3 |
| Example 6 | 165.4 | 124.0 |
| Example 7 | 164.1 | 123.7 |
| Example 8 | 164.7 | 118.7 |
| Example 9 | 165.7 | 116.2 |
| Example 10 | 167.4 | 114.8 |
| Example 11 | 167.8 | 114.8 |
| Case 6 (pure PP) | 167.6 | 126.9 |

From the above thermal performance test results, it can be seen that each of Examples 1 to 11 in Example Group 1 has a similar melting temperature and a slightly decreased crystallization temperature compared to Case 6 (pure PP). In other words, the thermochromic PP as provided in each of Examples 1 to 11 did not change the thermal performance of the PP substantially and thus they can be used in electrical devices or any other devices just like the pure PP.

Regarding Example Group 2 and Case 6, the thermal performance test results are illustrated in Table 23.

TABLE 23

Thermal performance test results of Example Group 2 and Case 6

|  | Thermal parameters | |
| --- | --- | --- |
| No. | $T_m$ (° C.) | $T_c$ (° C.) |
| Example 12 | 166.5 | 117.1 |
| Example 13 | 167.1 | 117.4 |
| Example 14 | 166.3 | 118.6 |
| Example 15 | 165.5 | 117.9 |
| Example 16 | 166.1 | 116.9 |
| Example 17 | 166.5 | 116.8 |
| Case 6 (pure PP) | 167.6 | 126.9 |

The above thermal performance test results are similar to those in Table 22. From the above thermal performance test results, it can be seen that each of Examples 12 to 17 in Example Group 2 had a similar melting temperature and a slightly decreased crystallization temperature compared to Case 6 (pure PP). In other words, the thermochromic PP as provided in each of Examples 12 to 17 did not change the thermal performance of the PP substantially and thus they can be used in electrical devices or any other devices just like the pure PP.

Regarding Example Group 3 and Case 6, the thermal performance test results are illustrated in Table 24.

TABLE 24

Thermal performance test results of Example Group 3 and Case 6

|  | Thermal parameters | |
| --- | --- | --- |
| No. | $T_m$ (° C.) | $T_c$ (° C.) |
| Example 18 | 166.3 | 116.5 |
| Example 19 | 166.5 | 117.4 |
| Example 20 | 164.5 | 116.2 |
| Example 21 | 166.4 | 116.6 |
| Case 6 (pure PP) | 167.6 | 126.9 |

The above thermal performance test results are similar to those in Tables 22 and 23. From the thermal performance test results, it can be seen that each of Examples 18 to 21 in Example Group 3 had a similar melting temperature and a slightly decreased crystallization temperature compared to Case 6 (pure PP). In other words, the thermochromic PP as provided in each of Examples 18 to 21 did not change the thermal performance of the PP substantially and thus they can be used in electrical devices or any other devices just like the pure PP.

Regarding Example Group 4 and Case 6, the thermal performance test results are illustrated in Table 25.

TABLE 25

Thermal performance test results of Example Group 4 and Case 6

|  | Thermal parameters | |
| --- | --- | --- |
| No. | $T_m$ (° C.) | $T_c$ (° C.) |
| Example 22 | 167.5 | 126.0 |
| Example 23 | 167.3 | 126.2 |
| Example 24 | 167.2 | 125.7 |
| Example 25 | 167.3 | 125.1 |
| Case 6 (pure PP) | 167.6 | 126.9 |

The thermal performance test results are similar to those in Tables 22 to 24. From the thermal performance test results, it can be seen that each of Examples 22 to 25 in Example Group 4 had a similar melting temperature and a slightly decreased crystallization temperature compared to Case 6 (pure PP). In other words, the thermochromic PP as provided in each of Examples 22 to 25 did not change the thermal performance of the PP substantially and thus they can be used in electrical devices or any other devices just like the pure PP.

Regarding Example Group 5 and Case 6, the thermal performance test results are illustrated in Table 26.

TABLE 26

Thermal performance test results of Example Group 5 and Case 6

|  | Thermal parameters | |
| --- | --- | --- |
| No. | $T_m$ (° C.) | $T_c$ (° C.) |
| Example 26 | 164.5 | 113.4 |
| Example 27 | 164.8 | 113.8 |
| Example 28 | 164.6 | 113.5 |
| Example 29 | 164.2 | 113.3 |
| Case 6 (pure PP) | 167.6 | 126.9 |

The thermal performance test results are similar to those in Tables 22 to 25. From the thermal performance test results, it can be seen that each of Examples 26 to 29 in Example Group 5 had a similar melting temperature and a slightly decreased crystallization temperature compared to Case 6 (pure PP). In other words, the thermochromic PP as provided in each of Examples 26 to 29 did not change the thermal performance of the PP substantially and t thus they can be also used in electrical devices or any other devices just like the pure PP.

By far, the present invention has been described with reference to the accompanying drawings through particular preferred embodiments. However, it should be noted that the present invention is not limited to the illustrated and provided particular embodiments. For example, the base material for forming the thermochromic polymer composition is not limited to PP, any other suitable material like those given hereinabove may also be used as the base polymer composition. The pigment is not limited to the "Green-Colorless" pigment provided by New Prismatic Enterprise Co., Ltd. either, and any other suitable pigment can be used as long as a desirable color change property can be achieved. The stabilizer is not limited to only the heat stabilizer, or the light stabilizer or both of them, any other stabilizer is also possible as long as it may enhance the stability of the composition and substantially keep its thermal performance. In addition, the heat stabilizer and the light stabilizer are not respectively limited to Irganox1010 and the light stabilizer UV-001 as well, any other suitable type of stabilizer can also be used as long as the stability of the composition can be enhanced and the thermal performance thereof can be substantially maintained. Although the specific process parameters are described in embodiments of the present disclosure, the present disclosure is not limited there to and any other parameters may be used as long as it can obtain the thermochromic polymer composition with desirable color change properties and thermal performance.

Though the present invention has been described with reference to the currently considered embodiments, it should be appreciated that the present invention is not limited the disclosed embodiments. On the contrary, the present invention is intended to cover various modifications and equivalent arrangements falling within in the spirit and scope of the appended claims. The scope of the appended claims is accorded with broadest explanations and covers all such modifications and equivalent structures and functions.

What is claimed is:

1. A thermochromic polymer composition comprising:
a base polymer material;
a temperature sensitive material, which changes a color of the thermochromic polymer composition in response to a temperature change; and
a stabilizer, which enhances stability performance of the thermochromic polymer composition;
wherein the temperature sensitive material comprises one or more temperature sensitive materials with a semi-reversible or reversible color change;
wherein the one or more temperature sensitive material with a semi-reversible or reversible color change have one or more threshold temperatures ranging from about −10° C. to about 70° C.

2. The thermochromic polymer composition of claim 1, wherein the stabilizer comprises one or more of a heat stabilizer and a light stabilizer.

3. The thermochromic polymer composition of claim 1, wherein a weight ratio of the temperature sensitive material to the stabilizer is from 1:0.1 to 1:10.

4. The thermochromic polymer composition of claim 1, wherein the base polymer material comprises one or more of polypropylene (PP), polyamide (PA, nylon), polytetrafluoroethylene (PTFE), poly(ethene-co-tetrafluoroethene (ETFE), polyetheretherketone (PEEK), poly(chlorotrifluoroethylene-ethylene) (ECTFE), polyethylene (PE), acetal, thermoplastic polyurethane (TPU), polyvinyl chloride (PVC), polyethylene terephthalate (PET), polyvinylidene difluoride (PVDF), copolymers thereof, or combination thereof.

5. The thermochromic polymer composition of claim 1, wherein the temperature sensitive material comprises one or more temperature sensitive materials with a threshold temperature of between 46° C. to 51° C.

6. The thermochromic polymer composition of claim 1, wherein the temperature sensitive material comprises one or more temperature sensitive materials with a threshold temperature of about 49° C.

7. The thermochromic polymer composition of claim 1, wherein the temperature sensitive material comprises one temperature sensitive material with a threshold temperature of about 49° C.

8. The thermochromic polymer composition of claim 2, wherein the heat stabilizer comprises one or more of a hindered phenol antioxidant, a phosphite ester antioxidant and a thiosynergist material.

9. The thermochromic polymer composition of claim 8, wherein the hindered phenol antioxidant comprises one or more of pentaerythritol tetrakys 3-(3,5-ditert-butyl-4-hydroxyphenyl) propionate, dibutylhydroxyphenylpropionic acid stearyl ester, 2,6-Di-tert-butyl-4-methylphenol, and calcium bis(monoethyl (3,5-ditert-butyl-4-hydroxylbenzyl) phosphonate); wherein the phosphite ester antioxidant comprises any one or more of tris(2,4-di-t-butylphenyl) phosphite, and bis-(2,4-di-tert-butyl-pheny)-phosphiterythritol diphosphate; or wherein the thiosynergist material comprises one or more of 2,4-bis(dodecylthiomethyl)-6-methylphenol, and 2-Methyl-4,6-bis((octylthio)methyl)phenol.

10. The thermochromic polymer composition of claim 2, wherein the light stabilizer comprises one or more of an ultraviolet light screening agent, an ultraviolet absorbent, a light quenching agent, and a radical scavenger.

11. The thermochromic polymer composition of claim 10, wherein the ultraviolet light screening agent comprises one or more of carbon black, zinc oxide, and titanium dioxide, wherein the ultraviolet absorbent comprises any one or more of benzophenone, benzotriazole, and triazine; wherein the light quenching agent comprises one or more of nickel compounds; wherein the radical scavenger comprises any one or more of bis (2,2,6,6-tetramethyl-4-piperidyl) sebacate, and benzoic acid (2,2,6,6-tetramethyl-4-piperidine) ester.

12. The thermochromic polymer composition of claim 1, wherein a total amount of the temperature sensitive material is from about 1 wt % to about 30 wt %, based on a total weight of the thermochromic polymer composition as a masterbatch.

13. The thermochromic polymer composition of claim 1, wherein a total amount of the temperature sensitive material is from about 0.01 wt % to about 20% based on a total weight of the thermochromic polymer composition as a composition formed from a masterbatch.

14. The thermochromic polymer composition of claim 1, wherein a total amount of the stabilizer is from about 1 wt % to about 30 wt % based on a total weight of the thermochromic polymer composition as a masterbatch.

15. The thermochromic polymer composition of claim 1, wherein a total amount of the stabilizer is from about 0.01 wt % to about 20% based on a total weight of the thermochromic polymer composition as a composition formed from a masterbatch.

16. An electrical device comprising the thermochromic polymer composition of claim 1.

17. The electrical device according to claim 16, wherein the electrical device comprises one of a cable tie, a cable connector, a terminal connector, a splice connector, and a cable jacket.

18. A process for preparing a thermochromic polymer composition, comprising a base polymer material, and a temperature sensitive material, which changes a color of the thermochromic polymer composition in response to a temperature change, and a stabilizer, which enhances stability performance of the thermochromic polymer composition, the process comprising:
mixing the base polymer material, the temperature sensitive material and the stabilizer in a mechanical mixing process to obtain a mixed material;
extruding the mixed material in an extrusion process to form an extrudant; and
cutting the extrudant to obtain the thermochromic polymer composition as a masterbatch.

19. A process for forming an electrical device from a thermochromic polymer composition, comprising a base polymer material, and a temperature sensitive material, which changes a color of the thermochromic polymer composition in response to a temperature change, and a stabilizer, which enhances stability performance of the thermochromic polymer composition, the process comprising:
mixing the thermochromic polymer composition as a masterbatch with a predetermined amount of base polymer material in a mechanical mixing process; and
processing the mixed composition in a molding process to obtain the electrical device.

20. The process for forming an electrical device according to claim 19, wherein the molding process comprises one of: an injection molding, an extrusion molding, a calendar molding, and a thermoforming molding.

* * * * *